Nov. 11, 1969  G. A. FISHER  3,477,344
FLUID MECHANICAL HYSTERETIC DEVICE
Filed May 24, 1967  2 Sheets-Sheet 1

INVENTOR
GEORGE A. FISHER
BY Norman Friedland
ATTORNEY

United States Patent Office
3,477,344
Patented Nov. 11, 1969

3,477,344
FLUID MECHANICAL HYSTERETIC DEVICE
George A. Fisher, Windsor Locks, Conn., assignor to United Aircraft Corporation, East Hartford, Connecticut, a corporation of Delaware
Filed May 24, 1967, Ser. No. 640,904
Int. Cl. F15b *13/042, 11/10;* F16k *31/12*
U.S. Cl. 91—52                                   7 Claims

ABSTRACT OF THE DISCLOSURE

One end of a piston, slidable in a housing, cooperates with the housing walls to define a variable orifice and a pressure chamber. A fixed orifice is located downstream from the chamber. When an increase in control pressure overcomes a piston bias, the piston moves from a first to a second position, increasing the cross-sectional area of the variable orifice, thereby causing an additional increase in chamber pressure. To return the piston to its first position, it is necessary to decrease the control pressure, thereby creating a hysteresis action.

---

The invention herein described was made under a contract with the Department of the Navy.

BACKGROUND OF THE INVENTION

Field of the invention

This invention relates to fluid mechanical systems and devices where fluid pressures are available as a function of the desired controlling parameters and more particularly to a hydraulically operated hysteretic device wherein accurate and simple control of a hysteresis loop over a wide range of values is possible.

Description of the prior art

In the hydro-mechanical art, it is commonly known that there is a need in certain environments for devices which will actuate at one set of conditions and deactuate in response to a different set of conditions. This type of operation is referred to herein as hysteretic operation.

In general, the hydraulic devices of the prior art that employ a hysteretic type of operation, depend upon some mechanical play or friction between moving parts to furnish the desired hysteresis action. In some of these devices, a cylindrical valve piston, having undercuts for the passage of fluid, is held in a housing by the force of friction between the valve piston and housing wall. In one such device, one end of the valve piston has an elongated extension with an oval shape slot therethrough. A control arm that pivots has a pin at one end engaged in the slot. An input signal causes the arm to pivot about its center, moving the pin in the slot. The hysteretic action arises from the fact that the pin must move from one end of the slot in the valve piston extension to the other end before the valve can be actuated or deactuated. Another type of apparatus employs a hydraulic servo loop containing a piston. Friction on the servo (between the piston and the cylinder wall) requires an added input motion to a control valve operated independently of the servo piston, to develop a great enough pressure differential across the servo to overcome the friction and start the servo (piston) moving.

In all of the above-mentioned prior devices, simple and accurate control of the magnitude of the hysteresis loop (and therefore the actuation and deactuation conditions) is a problem. In the above-mentioned hydraulic servo valve loop, the pressure sensitivity of the valve piston is extremely critical and it is difficult to control the hysteresis action. All of the prior hydraulic hysteretic devices are relatively unpredictable and the loop of hysteresis available for use is very limited.

SUMMARY OF INVENTION

An object of the invention is to provide a highly accurate and predictable fluid mechanical device, operative over a wide range of hysteresis loops.

In accordance with the present invention, a device is provided wherein a piston is moved from a first position toward a second position in response to a control pressure at a first pressure level, the piston being maintained at the second position until the control pressure is reduced to a second pressure level which is lower than the pressure at the first level. To provide this hysteretic action, the control pressure is admitted to a pressure chamber immediately behind the end of the piston through an inlet of predetermined cross-sectional flow area, additional inlet flow area into the pressure chamber and an increase in the volume thereof being provided as the piston moves toward the second position. Concurrently, the cross-sectional flow area of an outlet from the pressure chamber is held constant whereby a rapid-pressure buildup is effected in the pressure chamber insuring positive movement of the piston to the second position. The piston is maintained at the second position until the control pressure is reduced to the second pressure level at which time the piston is returned to the first position under the urging of suitable biasing means.

In one embodiment of the invention, the increase in chamber pressure is accomplished by having the end of the piston form one wall of a variable orifice (restriction to the flow of fluid) and chamber. The second (fixed) orifice is located downstream from the chamber and cooperates with the variable orifice and chamber to define the hydraulic device. When the control pressure overcomes the bias on the piston, the piston is actuated and moves in its housing and the size of the variable orifice increases compared to the size of the fixed orifice, so that a greater proportion of pressure is dropped across the fixed orifice. Consequently, the pressure in the pressure chamber, at the back of the piston intermediate the variable orifice and fixed orifice increases, and more pressure is available to move the piston. To return the piston to the deactuated position, the control pressure must be reduced to compensate for the increase in chamber pressure, thereby creating the hysteresis loop action.

The invention accordingly provides a device that can reciprocate the piston in an engine or function as a switch to change from one state to another.

The foregoing and other objects, features and advantages of the present invention will become more apparent in the light of the following detailed description of preferred embodiments thereof, as illustrated in the accompanying drawings.

DESCRIPTION OF THE PREFERRED EMBODIMENT

Figure 1:
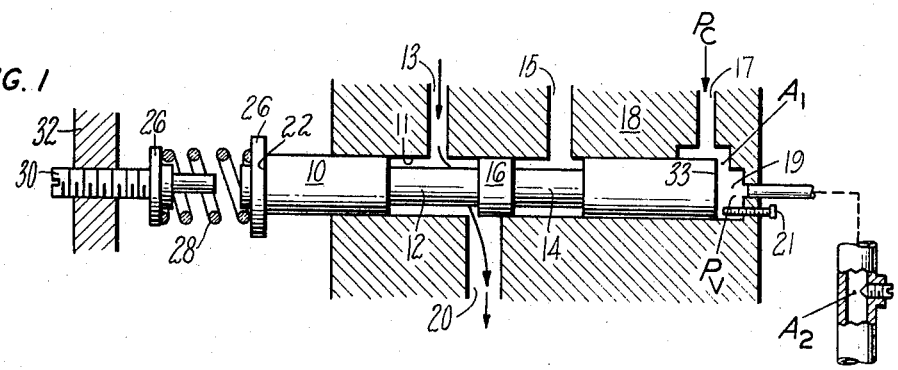
FIGURE 1 is a sectional elevation view of a preferred embodiment of the invention utilized as a hydraulic bistable switch and shows the switch in the deactuated position.
Figure 2:
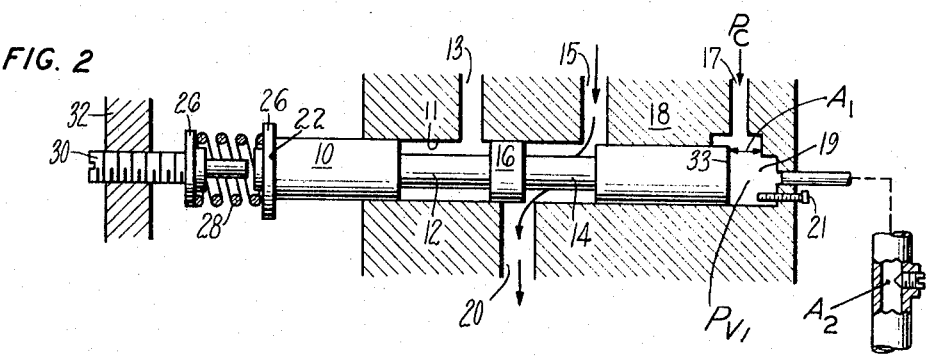
FIGURE 2 is a sectional elevation view of the hydraulic bistable switch of FIGURE 1, shown in the actuated position.

Referring generally to the preferred embodiment of FIGURES 1 and 2, a housing 18 contains a cavity 11 in which a cylindrical valve piston 10 is free to slide longitudinally. The piston 10 has two undercuts 12 and 14 that are separated by a land 16. Two input ports 13, 15 and an output port 20 connect with the cavity 11. These ports cooperate to form two possible fluid paths through the cavity 11, depending upon the position of the piston 10. In the deactuated position shown in FIGURE 1, fluid passes around the undercut 12 to form a fluid path between the input port 13 and the output port 20. When the valve piston 10 is actuated, the piston moves to the left to the position shown in FIGURE 2, and fluid passes around the undercut 14 creating a fluid path between the input port 15 and the output port 20. One end 22 of the piston 10 is operatively connected to a spring 28 by means of a spring support member 26. The opposite end of the spring has a similar spring support member 26, having an extended threaded portion 30 that passes through a frame or member 32. Force on the spring can be adjusted by screwing the spring supporting member 26 into, or out of, the member 32. The control fluid pressure that actuates the piston enters the housing 18 through a port 17 and is indicated in FIGURES 1 and 2 as $Pc$. An orifice area $A1$ directly behind the upper portion of the piston end 33 is defined as the variable restriction choke formed by this upper portion of the piston end 33 and the wall of the valve housing 18. A pressure chamber 19 is situated downstream from the orifice $A1$ and is defined by the lower portion of the piston end 33 and the wall of the valve housing 18. An adjustable stop 21 can be varied to regulate the cross-sectional flow area of the orifice $A1$ when the valve is in the deactuated position. The cross-sectional area of the orifice $A1$ increases as the piston displaces to the left, i.e., when the piston is actuated by control pressure $Pc$. The pressure in the chamber 19 acting on the piston end 33 is indicated in FIGURES 1 and 2 as $Pv$. A fixed orifice $A2$ is located in the flow path downstream from the pressure chamber 19 to provide a second (fixed) restriction to the flow of fluid.

The positive feedback principle of the invention can be adequately described by discussing the operation of the valve hereinafter in relation to the control pressure and the fluid flow through the orifices.

In the following discussion, the control pressure $Pc$, is considered to be an infinite source of pressure, the value of which is independent of the flow area of the orifice $A1$ or the chamber pressure $Pv$. The valve is illustrated in FIGURE 1 in the deactuated position and a fluid path is formed from the input port 13 to the output port 20. When the control pressure $Pc$ is increased, the chamber pressure $Pv$ in the chamber 19 also increases. Upon $Pv$ reaching a predetermined value, the biasing force supplied by the spring 28 is overcome, allowing the piston 10 to slide to the left. This sliding action commences very rapidly, and immediately upon the piston moving to the left, the cross-sectional flow area of the variable orifice $A1$ increases and its restrictive action decreases, resulting in an increase in the pressure $Pv$ in the chamber 19, to a greater value $Pv1$. Concurrently, there is a decrease in $\Delta P$ across variable orifice $A1$ that is compensated for by an increase in $\Delta P$ across the fixed orifice $A2$. Therefore, the increase in the cross-sectional flow area of the variable orifice $A1$ and increase in the pressure $Pv$ in the chamber 19 to a greater pressure $Pv1$ as the piston slides to the left is the positive feedback action that insures complete actuation at the desired operating point determined by $Pc$. Thus, hunting or other indefinite operation of the valve is avoided.

After the piston 10 has moved to the left and is in the actuated position (shown in FIGURE 2) and $Pv$ has increased to a larger value $Pv1$, as discussed hereinbefore, a fluid path is established between the port 15 and the output port 20.

In order for the valve to deactuate, thereby displacing the piston 10 to the right, $Pv1$ must essentially be decreased to its original value $Pv$; this is, of course, the converse of the conditions necessary to actuate the valve. Because $Pc$ remains constant at the operating point while $Pv$ increases to a new value $Pv1$, $Pc$ must be decreased to a lower value to deactuate the valve. In other words, $Pc$ must be decreased to cause a decrease in $Pv1$ and enable the valve to move to the right to its deactuated position. Therefore, by employing a first control pressure $Pc$ to actuate the piston and a second lower value of $Pc$ to deactuate the valve piston, a hysteresis band is provided.

Figure 3:
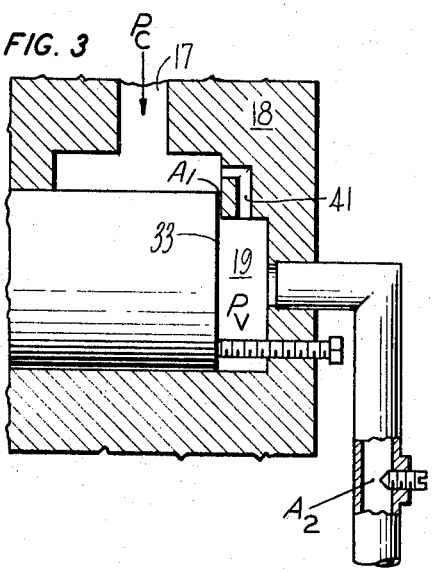
FIGURE 3 is a sectional elevation view of an alternate embodiment having a bleed through the housing.
Figure 4:
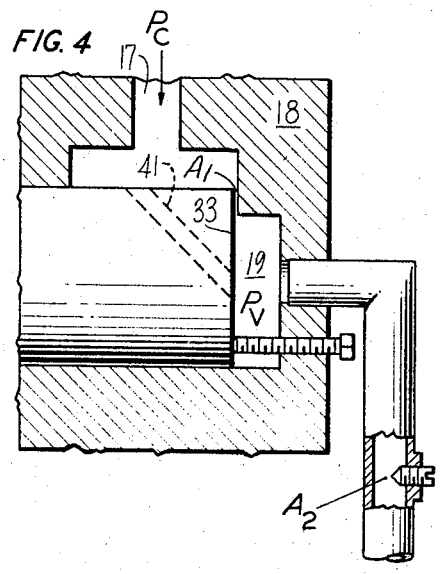
FIGURE 4 is a sectional elevation view of an alternate embodiment having a bleed through the piston.
Figure 5:
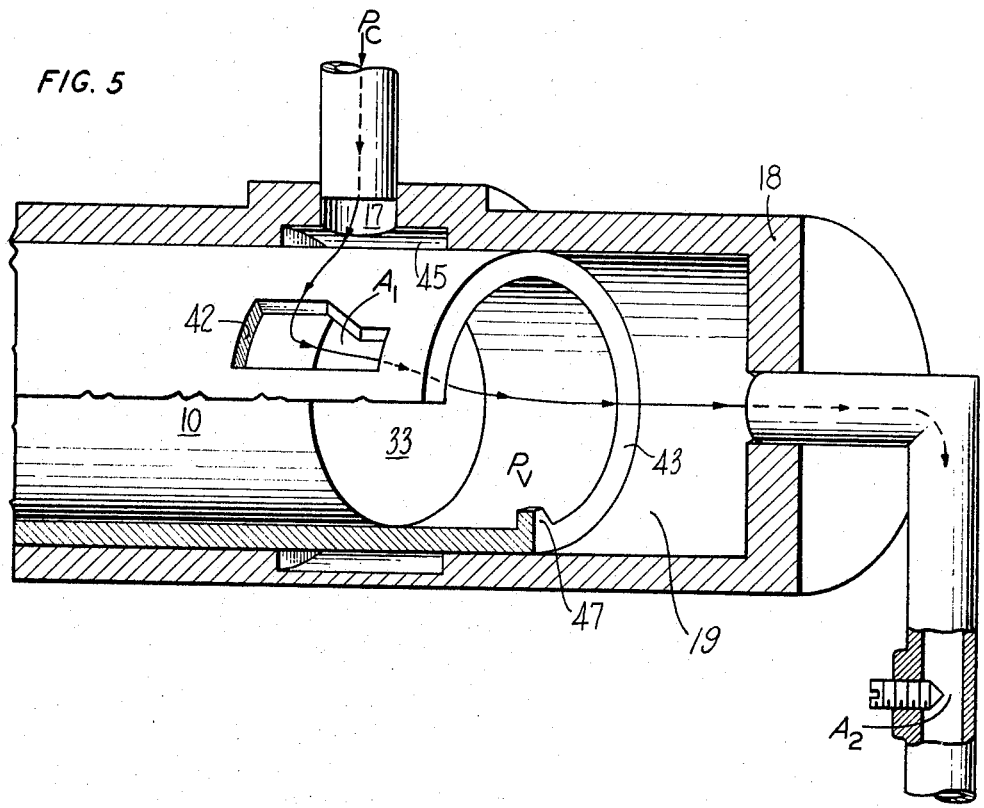
FIGURE 5 is a sectional partially broken away perspective of a different embodiment of the switch having a variable orifice cut in the side of a sleeve.

Alternate arrangements of the variable orifice are shown in FIGURES 3, 4 and 5. In FIGURE 3, the piston end 33 abuts against the housing wall when the piston is in the deactuated position, closing the variable orifice $A1$ completely. In order for pressure to build up in the pressure chamber 19 when there is an increase in the value of $Pc$, a permanent bleed channel 41 is provided in the housing 18, to bleed fluid around the variable orifice $A1$ and into the chamber 19 with the piston in the deactuated position. When $Pc$ has increased to a value that enables the pressure $Pv$ in the chamber 19 to overcome the biasing force created by the spring 28, the piston 10 begins to slide to the left. Immediately upon moving, the variable orifice $A1$ opens and is responsible for the buildup of the pressure $Pv$ to the pressure $Pv1$ as hereinbefore discussed. The maximum value of pressure in the chamber 19, is of course, limited to the value of $Pc$. That is, the orifice $A1$ can increase in cross-sectional flow area to the point where it no longer acts as a restriction to the flow of fluid and $Pv$ approximates $Pc$.

In the embodiment of FIGURE 4, the bleed channel 41 passes through the piston end 33 and serves the same purpose as discussed in conjunction with the embodiment of FIGURE 3.

In the embodiment of FIGURE 5, the variable orifice $A1$ is provided by an aperture 42 cut in the wall of a sleeve 43. The sleeve 43 is fixedly attached to the inside housing wall 18 and piston 10 slides inside this sleeve. A circular groove 45 is cut around the inside of the housing wall 18 and connects with the control pressure port 17. Fluid circulates in the circular groove 45, between the housing wall 18 and the sleeve 43, and passes through the variable orifice $A1$ to the chamber 19. A stop 47 limits the actuated position of the valve piston 10. The operation of the piston is as discussed hereinbefore in conjunction with the embodiments of FIGURES 1 and 2. The shape of the aperture 42 can be varied to alter the operating characteristics of the device. The aperture 42 can be formed at the mouth of the inlet port 17, thus eliminating the sleeve 43 and the groove 45.

Figure 6:
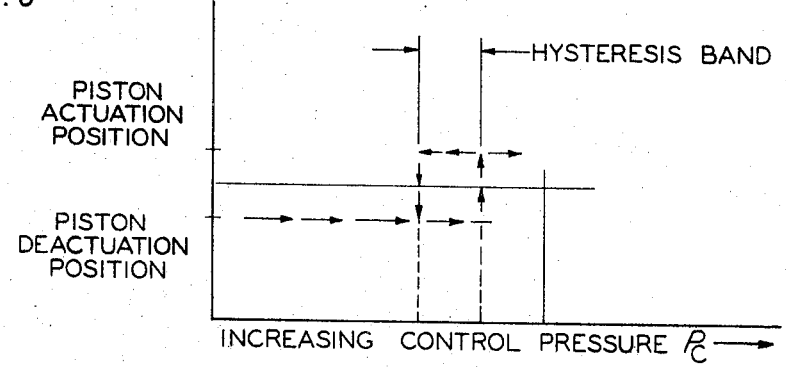
FIGURE 6 is a diagram showing the actuation and deactuation pressures of the switch in relation to the hysteresis loop.

The relation of the actuation and deactuation pressures of the device to the hysteresis loop is explained in conjunction with FIGURE 6. The values of increasing control pressure $Pc$ shown in the horizontal axis are arbitrary and may be selected from a large range of desired operating conditions. When $Pc$ increases to the point where the biasing force of the spring 28, discussed in conjunction with FIGURES 1 and 2, is overcome, the valve is actuated. Because of the positive feedback principle discussed hereinbefore, the valve remains actuated until $Pc$ drops to a lower value. Thus, a hysteresis loop is provided that discourages any tendency of the valve to cycle on and off at the actuation point.

Although the invention has been shown and described with respect to preferred embodiments thereof, it should be understood by those skilled in the art that the foregoing and other changes and omissions in the form and detail thereof may be made therein without departing from the spirit and scope of the invention, which is to be limited and defined only as set forth in the following claims.

Having thus described typical embodiments of the invention, that which is claimed as new and to be secured by Letters Patent of the United States is:

1. A hysteretic device comprising:
   a housing having a cavity therein;
   a piston slidably disposed in said cavity, one end of said piston cooperating with a portion of said housing to form a pressure chamber in said cavity, said piston being movable from a first position in which the volume of said pressure chamber is at a minimum value to a second position in which the volume of said pressure chamber is at a maximum value;
   means for biasing said piston into said first position; and
   fluid inlet means and fluid outlet means communicating with said pressure chamber, a fixed restriction in said outlet means, said piston cooperating with said inlet to define a variable orifice, the areas of said fixed restriction and variable orifice being dimensioned to provide effective cross-sectional flow areas selected to maintain a continuous predetermined flow through said pressure chamber, the movement of said piston towards said second position providing additional inlet flow area to said pressure chamber.

2. A hysteretic device according to claim 1 additionally comprising:
   stop means cooperating with said piston to define said first position of said piston and said minimum volume of said pressure chamber.

3. A hysteretic device comprising:
   a housing having a cavity therein;
   a piston slidably disposed in said cavity, one end of said piston cooperating with a portion of said housing to form a pressure chamber in said cavity, said piston being movable from a first position in which the volume of said pressure chamber is at a minimum value to a second position in which the volume of said pressure chamber is at a maximum value;
   means for biasing said piston into said first position; and
   fluid inlet means and fluid outlet means including a fixed restriction communicating with said pressure chamber with said piston in said first position, said fluid inlet means and said fixed restriction each having respective effective cross-sectional flow areas selected to maintain a predetermined continuous flow through said pressure chamber, the movement of said piston towards said second position providing additional inlet flow area to said pressure chamber;
   said cross-sectional area associated with said fluid inlet means being defined by said one end of said piston and said housing walls when said piston is in said first position,
   and a bleed channel through said housing into said pressure chamber bypassing said one end of said piston when said piston is in said first position.

4. A hysteretic device according to claim 3 wherein:
   said inlet means includes a bleed channel through said piston into said pressure chamber with said piston in said first position.

5. A hysteretic device according to claim 3 additionally comprising:
   a source of control fluid pressure connected to said inlet means;
   said piston being movable from said first position to said second position in response to a control pressure at a first pressure level, said piston being returned to said first position in response to a control pressure at a second pressure level, said second pressure level being less than said first pressure level to effect a hysteresis action.

6. A hysteretic device comprising:
   a housing having a cavity therein;
   a piston slidably disposed in said cavity, one end of said piston cooperating with a portion of said housing to form a pressure chamber in said cavity, said piston being movable from a first position in which the volume of said pressure chamber is at a minimum value to a second position in which the volume of said pressure chamber is at a maximum value;
   means for biasing said piston into said first position;
   fluid inlet means and fluid outlet means including a fixed restriction communicating with said pressure chamber with said piston in said first position, said fluid inlet means and said fluid outlet means each having respective effective cross-sectional flow areas selected to maintain a continuous predetermined flow through said pressure chamber, the movement of said piston towards said second position providing additional inlet flow area to said pressure chamber;
   a sleeve in said cavity surrounding said piston;
   said cross-sectional area associated with said inlet means comprising an opening in the side of said sleeve; and
   said housing having a groove around the periphery of said cavity, said groove communicating with said fluid inlet means and forming a passageway for fluid around the outside periphery of said sleeve and intermediate said sleeve and said housing.

7. A hysteretic device comprising:
   a housing having a cavity therein;
   a piston slidably disposed in said cavity, one end of said piston cooperating with a portion of said housing to form a pressure chamber in said cavity, said piston being movable from a first position in which the volume of said pressure chamber is at a minimum value to a second position in which the volume of said pressure chamber is at a maximum value;
   means for biasing said piston into said first position;
   fluid inlet means and fluid outlet means communicating with said pressure chamber with said piston in said first position, said fluid inlet means and said fluid outlet means each having respective effective cross-sectional flow areas selected to maintain a predetermined flow through said pressure chamber, the movement of said piston towards said second position providing additional inlet flow area to said pressure chamber;
   said housing having a first and a second pressure port connecting said cavity and spaced longitudinally therein;
   said housing having an output port connecting said cavity;
   said output port being spaced intermediate said first pressure port and said second pressure port; and
   said piston having a first undercut opposite said first pressure port, and a second undercut opposite said second pressure port, said first undercut forming a path between said first pressure port and said output port when said piston is in said first position, said second under cut forming a path between said second pressure port and said output port when said piston is in said second position.

References Cited

UNITED STATES PATENTS

| | | | |
|---|---|---|---|
| 2,980,174 | 4/1961 | Rogers | 60—241 |
| 3,020,925 | 2/1962 | Randall et al. | 251—35 X |
| 3,347,135 | 10/1967 | Ahlbeck et al. | 91—392 X |
| 3,367,369 | 2/1968 | Wagner | 251—35 X |

CHARLES J. MYHRE, Primary Examiner

U.S. Cl. X.R.

91—431; 137—625.66; 251—35